(12) United States Patent
O'Connor (10) Patent No.: US 9,919,653 B2
(45) Date of Patent: Mar. 20, 2018

(54) ADJUSTABLE MIRROR ASSEMBLY (71) Applicant: John O'Connor, Hartford, KS (US)

(72) Inventor: John O'Connor, Hartford, KS (US)

( * ) Notice: Subject to any disclaimer, the term of this patent is extended or adjusted under 35 U.S.C. 154(b) by 0 days.

(21) Appl. No.: 15/090,352

(22) Filed: Apr. 4, 2016

(65) Prior Publication Data
US 2016/0288716 A1 Oct. 6, 2016

Related U.S. Application Data (60) Provisional application No. 62/142,011, filed on Apr. 2, 2015.

(51) Int. Cl.
*B60R 1/10* (2006.01)
*B60Q 1/24* (2006.01)
*G02B 7/182* (2006.01)
*B60Q 1/04* (2006.01)

(52) U.S. Cl.
CPC ............ *B60R 1/105* (2013.01); *B60Q 1/0483* (2013.01); *B60Q 1/24* (2013.01); *G02B 7/1827* (2013.01)

(58) Field of Classification Search
CPC .......... B60R 1/105; G02B 7/1827; B60Q 1/02
USPC ................................................. 359/843, 877
See application file for complete search history.

(56) References Cited

U.S. PATENT DOCUMENTS

| | | | | |
|---|---|---|---|---|
| 1,576,793 A * | 3/1926 | Sadler | ..................... | B60R 1/105 359/841 |
| 1,635,011 A * | 7/1927 | Sadler | ..................... | B60R 1/105 359/406 |
| 1,903,239 A * | 3/1933 | Leffland | ................... | B60R 1/105 180/199 |
| 2,758,508 A * | 8/1956 | Petri | ....................... | B60R 1/002 359/841 |
| 2,827,255 A * | 3/1958 | Kampa | ................... | B60R 1/078 248/285.1 |
| 3,205,777 A * | 9/1965 | Brenner | ................... | A47G 1/24 248/480 |
| 3,241,253 A * | 3/1966 | McKee | ................... | E01H 5/098 37/228 |
| 3,932,028 A * | 1/1976 | Klingler | ............. | B62D 49/0614 172/430 |
| 3,972,597 A * | 8/1976 | Repay | ..................... | B60R 1/072 248/479 |
| 5,115,352 A * | 5/1992 | do Espirito Santo | ..... | B60R 1/06 359/855 |
| 5,430,651 A | 7/1995 | Nielsen et al. | | |

(Continued)

FOREIGN PATENT DOCUMENTS

JP   57-205249   * 6/1981

*Primary Examiner* — Ricky D Shafer
(74) *Attorney, Agent, or Firm* — Global Intellectual Property Agency, LLC; Daniel Enea (57) ABSTRACT

An adjustable mirror assembly. The adjustable mirror assembly includes one or more mirrors that are affixed to a front portion of a vehicle and configured to view the underside of the vehicle. The mirrors allow for both vertical movement and horizontal and vertical angular adjustment. Thus, the mirrors can have a field of view of the underside of the vehicle, which may include a blade for grading road and ground surfaces. In one embodiment, the mirrors are controllable from a control box positioned within the vehicle by a vehicle operator. Further, one or more light sources can be activated to illuminate a desired area for improved vision in low and no light conditions.

14 Claims, 5 Drawing Sheets

(56) References Cited

U.S. PATENT DOCUMENTS

| | | | | |
|---|---|---|---|---|
| 5,621,577 | A | * | 4/1997 | Lang .................... B60R 1/0605 248/479 |
| 5,666,227 | A | * | 9/1997 | Ben-Ghiath ............ B60R 1/002 359/630 |
| 5,687,035 | A | * | 11/1997 | Lang .................... B60R 1/0612 359/864 |
| 7,287,867 | B2 | * | 10/2007 | Wellington ............. B60R 1/078 359/841 |
| 7,448,765 | B2 | * | 11/2008 | Lang .................... B60R 1/0605 359/879 |
| 2007/0137872 | A1 | | 6/2007 | Ziebell |
| 2012/0246977 | A1 | | 10/2012 | Proeber et al. |
| 2013/0255977 | A1 | | 10/2013 | Braunstein et al. |
| 2013/0304331 | A1 | | 11/2013 | Braunstein et al. |

* cited by examiner

ADJUSTABLE MIRROR ASSEMBLY

CROSS REFERENCE TO RELATED APPLICATION

This application claims the benefit of U.S. Provisional Application No. 62/142,011 filed on Apr. 2, 2015. The above identified patent application is herein incorporated by reference in its entirety to provide continuity of disclosure.

BACKGROUND OF THE INVENTION

The present invention relates to a mirror assembly. More specifically, the present invention relates to an adjustable mirror assembly configured to allow a vehicle operator to view a grader blade and the underside of a vehicle while operating the vehicle.

Roads are conventionally constructed of various materials including gravel, asphalt, and concrete that rests atop a foundation of gravel, rocks, sand, earth, and similar loose material. During the construction and maintenance of these roads, the road and road foundation material require periodic leveling/grading in order to smooth the surface. A smooth road and road surface is desired for extending the life of the road and for the comfort of users.

A construction vehicle having a blade, commonly referred to as a grader or road grader, is often employed in a variety of tasks, including as shaping tools to grade the road materials to a specified design. These specified road designs include a variety of specification including level surfaces, inclined surfaces, cambered surfaces, ditches, and many others. In order to create the desired shape and contour, the grader utilizes a grader blade that can be generally rotated, tilted, raised, lowered, and move laterally to any number of desired positions. Typically, the blade is affixed to the underside of the grader vehicle and operably connected to a motor having the ability to control the blade positioned as desired. The blade position is highly variable and specific to each construction project. However, standard graders do not provide the vehicle operator a reflective means of viewing the grader blade while operating the grader vehicle and an adjusting mechanism for altering the viewing means position as desired.

Some attempts have been made to provide a display wherein the blade is displayed to the operator on a display screen. However, these attempts required expensive equipment such as a camera to have a wired connection with a monitor. Further, these attempts fail to provide an adjustment means directed at altering the field of view of the display. Thus, it is desirable to provide an adjustable mirror assembly that enables viewing the underside of a vehicle, wherein the mirrors are adjustably controllable via a control box.

In light of the devices disclosed in the prior art, it is submitted that the present invention substantially diverges in design elements from the prior art and consequently it is clear that there is a need in the art for an improvement to existing mirror assemblies for vehicles. In this regard the instant invention substantially fulfills these needs.

SUMMARY OF THE INVENTION

In view of the foregoing disadvantages inherent in the known types of mirror assemblies for vehicles now present in the prior art, the present invention provides an adjustable mirror assembly wherein the same can be utilized for viewing the underside of a vehicle during the operation thereof.

It is therefore an object of the present invention to provide a new and improved adjustable mirror assembly that has all of the advantages of the prior art and none of the disadvantages.

The present invention relates to an adjustable mirror assembly comprising one or more mirrors having a reflective element, wherein the one or more mirrors are mounted to a vehicle.

It is therefore an object of the present invention to provide an adjustable mirror assembly that is operably connected to an actuator or motor that enables a vehicle operator to select a desired position of the mirror.

It is therefore an object of the present invention to provide an adjustable mirror assembly attached to a front portion of the vehicle that moves vertically thereon, for viewing of the underside of the vehicle, wherein a blade configured for grading road surfaces is disposed.

It is therefore an object of the present invention to provide an adjustable mirror assembly comprising at least one mirror having a first side that allows for a wide field of view such that a vehicle operator seated within the vehicle can view the underside of the vehicle and the surrounding area.

It is therefore an object of the present invention to provide a control box that is operably connected to the adjustable mirrors, wherein a vehicle operator can selectively adjust the position of the mirrors for optimal viewing of the blade and underside of the vehicle.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Reference is made herein to the attached drawings. Like reference numerals are used throughout the drawings to depict like or similar elements of the adjustable mirror assembly. For the purposes of presenting a brief and clear description of the present invention, the preferred embodiment will be discussed as used for viewing the underside of a vehicle and selectively adjusting the mirror assembly to view a blade affixed to the vehicle. The figures are intended for representative purposes only and should not be considered to be limiting in any respect.

Figure 1:
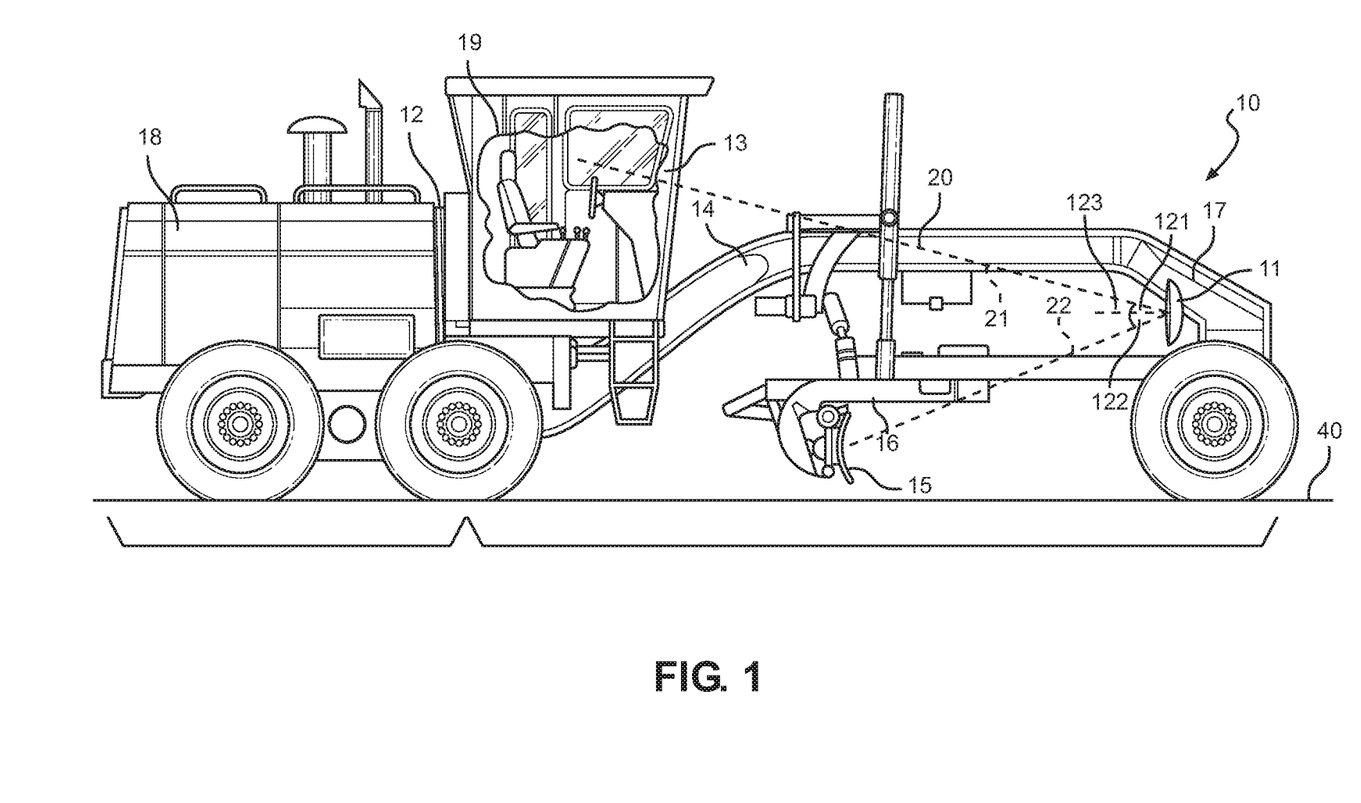
FIG. 1 shows a side view of one exemplary motor grader in accordance with one embodiment of the present invention.

Referring now to FIG. 1, there is a shown side view of one exemplary motor grader in accordance with one embodiment of the present invention. The present invention provides an adjustable mirror assembly 10 having one or more mirrors 11 that are removably affixed to a vehicle 12. The vehicle 12 can be any conventional vehicle such as a grader, tractor, truck, or the like. In the shown embodiment, the grader vehicle 12 comprises a body 14 including a cabin 13 having a driver seat 19 disposed therein configured to seat a vehicle operator and a beam 20 that connects a first front portion 17 and an opposing back portion 18. A grader blade 15 is mounted to the body 14 between the front and back portions 17, 18. The grader blade 15 is configured so engage with gravel and other material disposed on the ground 40 to create a desired road surface grade or design. Generally, the blade 15 that can be rotated, tilted, raised, lowered, and move laterally to any number of desired positions. In the shown embodiment, the body 14 comprise an underside 16 wherein the blade 15 is affixed thereto, and operably connected to a motor of the grader vehicle 12 having the ability to control the blade 15 positioned as desired.

The adjustable mirror assembly 10 comprises one or more mirrors 11 having a reflective element facing the back portion 18 of the vehicle 12. The mirrors 11 are configured to allow a vehicle operator in the cabin 13 to view the underside 16 of the body 14 and the blade 15. In the shown embodiment, the mirror 11 are disposed on the front portion 17 and are directed towards the cabin 13. Further, the mirrors 11 is positioned at a height between the cabin 13 and the blade 15, whereby the blade 15 is viewable from the cabin 13.

In the shown embodiment, an angle of incidence 121 is defined between an incoming incident ray 21 and a normal 123, and an angle of reflection 122 is defined between an outgoing reflected ray 22 and the normal 123, wherein the normal 123 is perpendicular to the mirror 11. The incident ray 21 originates from the cabin 13 and is reflected at the mirror 11 to become the reflected ray 22 directed towards the grader blade 15. This illustration shows that the vehicle operator positioned within the cabin 13 and looking at the mirror 11 along the incident ray 21 and reflected ray 22, will be able view the blade 15. In the shown embodiment, the angle of incidence 121 and the angle of reflection 122 sum to approximately 70 degrees, however in alternative embodiments the summed angles 121, 122 may range between 20 degrees and 170 degrees. In the shown embodiment, the mirror 11 comprises a planar reflective surface that allows the angle of inflection 121 to equal the angle of reflection 122, when measured with respect to the normal 123 to the mirror. However, in alternative embodiment, the mirror 11 may comprise a non-planar surface, such as a concave or convex surface, wherein the angle of inflection 121 will not equal the angle of reflection 122. Further, the mirror 11 can be reflected on secondary mirrors (not shown) to provide a secondary view of the blade 15 if desirable.

Figure 2:
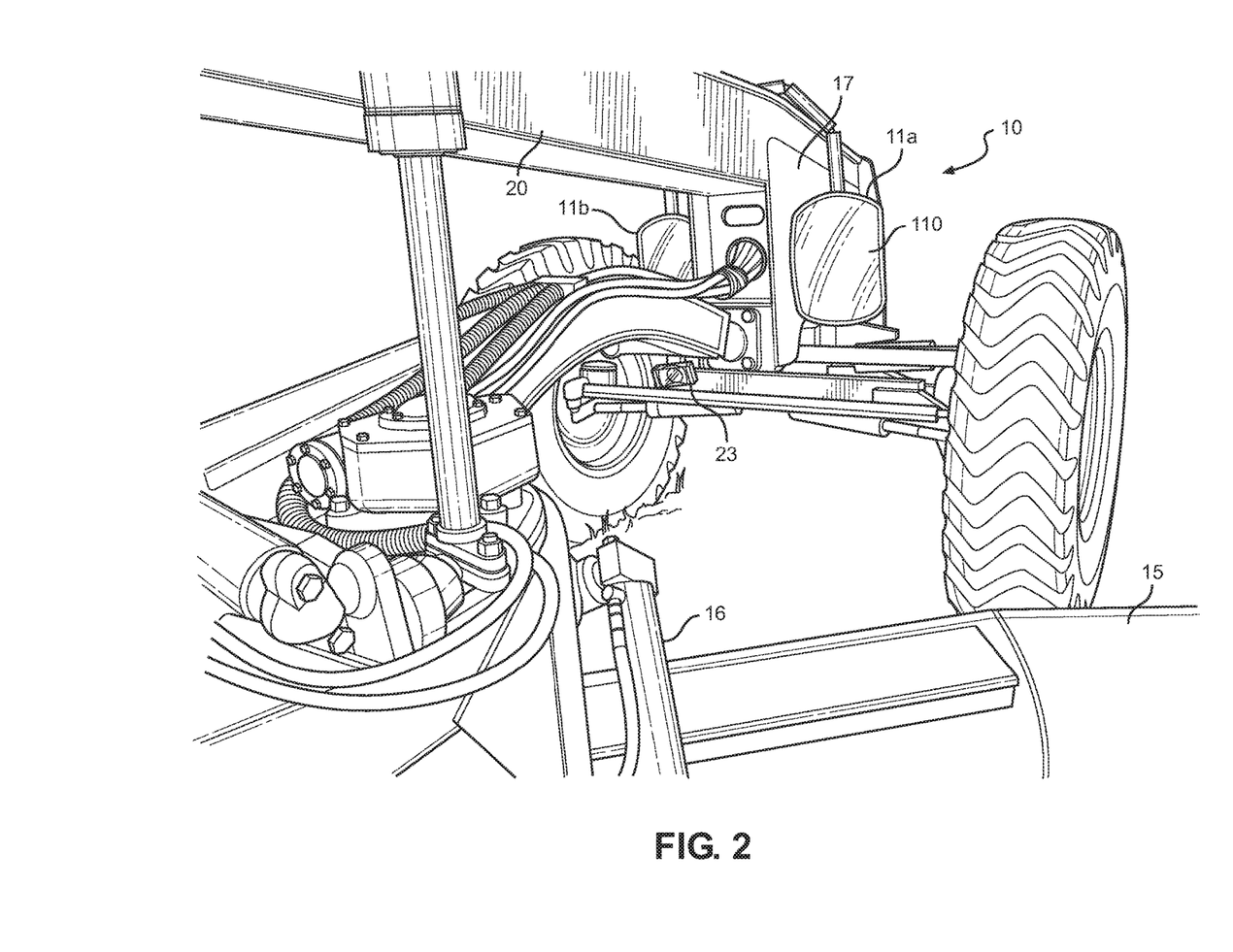
FIG. 2 shows a perspective view of one embodiment of the present invention.

Referring now to FIG. 2, there is a shown perspective view of one embodiment of the present invention. In the shown embodiment, the adjustable mirror assembly 10 comprises a first mirror 11a and second mirror 11b disposed on opposing sides of the front portion 17 of the grader vehicle 12. However, in alternative embodiments, the adjustable mirror assembly 10 may be disposed on any part of the vehicle that enables a vehicle operator to view the blade 15 or underside 16 of the body 14.

In the shown embodiment, each first and second mirror 11a, 11b comprise a first side 110 and a second side (not shown), wherein the first side 110 includes a reflective element generally facing towards the back portion (not shown) of the vehicle and blade 15. The shown mirror 11b is generally rectangular, however in alternative embodiment the mirrors 11a, 11b may comprise any suitable shape such as circular, polygonal, and the like. Further, the first and second mirrors 11a, 11b are concave to provide a wider field of view from the perspective of the driver seat (not shown). However, in alternative embodiments, the mirrors 11a, 11b are generally flat. In yet another embodiment, the mirrors 11a, 11b are configured to magnify the blade 15 or underside 16 of the body 14.

In alternative embodiments, the adjustable mirror assembly 10 further include one or more light sources 23 configured to illuminate the blade 15 or underside 16 of the body 14. The light sources 23 allow visibility of the blade 15 or underside 16 of the body 14 in low light or no light conditions. In the shown embodiment, the light source 23 comprises an LED light affixed via any suitable fastener to the front portion 17 of the vehicle. Further, the light source 23 is operably connected to the power source of the vehicle 12 and controllable from the vehicle controls.

Figure 3:
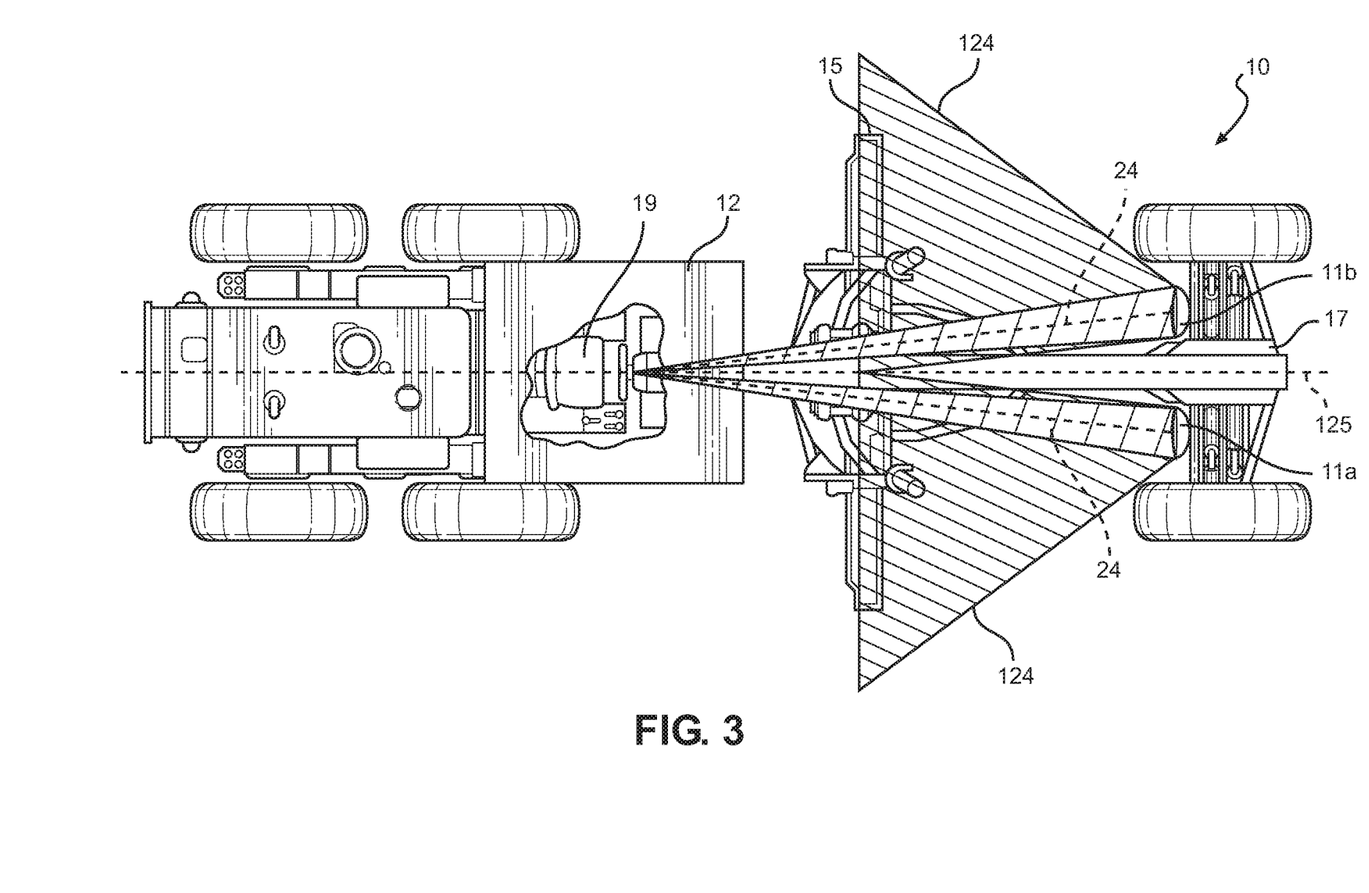
FIG. 3 shows an overhead view of one exemplary motor grader and possible field of view in accordance with one embodiment of the present invention.

Referring now to FIG. 3, there is a shown overhead view of one exemplary motor grader and possible field of view in accordance with one embodiment of the present invention. In the shown embodiment, a field of view 24 from the perspective of the driver seat 19 of the vehicle 12 directed towards the mirrors 11a, 11b creates a field of view 124 presented by the mirrors 11a, 11b to the driver seat 19. In one use, the vehicle operator having the mirrors 11a, 11b adjusted to the shown fields of view 24, 124 has ready access to information concerning objects present in the surroundings of the vehicle. This information includes positions of the blade 15, the distance to a road surface, the uniformity of gravel or other material, the closeness to objects adjacent to the vehicle, and the like. In the shown embodiment, the field of view 124 extends from about the center line 125 of the vehicle 12 to past the distal ends of the blade 15. Thus, the mirrors 11a, 11b provides a field of view 124 of at least the entire blade 15. In alternative embodiments, the mirrors 11a, 11b have overlapping fields of view 124 that allows the vehicle operator to view the blade 15 from differing perspectives. This is also beneficial during the turning of the vehicle, as the desired field of view 124 may be altered depending on the amount of turning.

Figure 4:
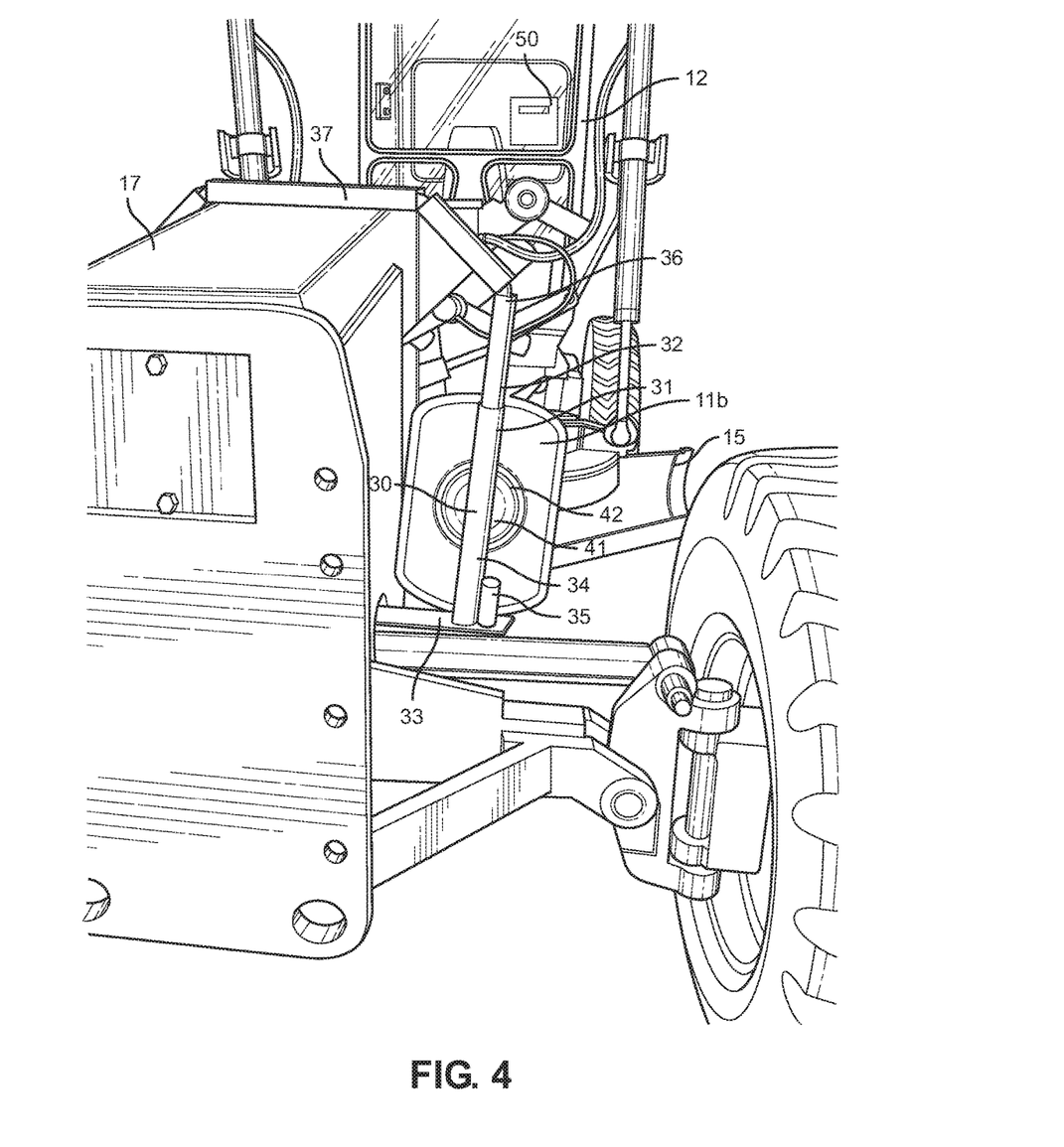
FIG. 4 shows a front end view of one exemplary motor grader in accordance with one embodiment of the present invention.

Referring now to FIG. 4, there is a shown front end view of one exemplary motor grader in accordance with one embodiment of the present invention. In the shown embodiment, the mirror 11b is affixed to a sliding rod 30 adapted for vertical movement/translation thereof. Further, the sliding rod 30 comprise one or more elongated sections 31, 32. In the shown embodiment, a first elongated section 31 is adjustably secured to a second elongated section 32 so as to allow the sliding rod 30 to extend into an extended position and retract into a retracted position. This telescopic arrangement of the elongated sections 31, 32 provides for adjustment of the linear length of the sliding rod 30. The elongated sections 31, 32 are fastened to one another via any suitable fastener, such as a threaded connection.

In the shown embodiment, the first elongated section 31 of the sliding rod 30 includes a first end 34 and an opposing second end 36, wherein the first end 34 is affixed to a support bar 33 that is affixed to the front portion 17 of the vehicle 12 via any suitable fastener and comprises one or more actuators 35, such as a linear actuator. The actuator 35 allows a user to select the desired position of the attached mirror 11b. In the illustrated embodiment, the elongated sections 31, 32 are tubular members comprising a rectangular cross-section, however in alternative embodiments, the elongated sections 31, 32 may comprise any suitable cross-sectional shape. The telescopic arrangement of the sliding rod 30 enables the adjustable mirror assembly 10 to adjust the field of view of users.

In the shown embodiment, the second end 36 of the sliding rod 30 is affixed to a cross member 37, wherein the cross member 37 secures the second end 36 of the sliding rod 30 to the front portion 17 of the vehicle 12. In an alternative embodiment, the cross member 37 is connected to a sliding rod (not shown) having another mirror (not shown) disposed on the opposing side of the front portion 17 of the vehicle.

The sliding member 30 is operably connected to the actuator 35, wherein the actuator 35 is configured to selectively move the vertical position of the attached mirror 11b. The actuator 35 is in electronic communication with, and powered by the motor of the vehicle 12. However, in alternative embodiments, the actuators 35 may have a separate power source. In an alternative embodiment, the actuator 35 may comprise a worm gear, wherein the worm gear is an arrangement of a gear operably connected to a threaded screw, such that the threaded screw is coaxial with the sliding rod. Thus, rotation of the gear causes the threaded screw, sliding rod, and mirror 11b to move vertically.

At least one of the mirrors 11b is pivotally affixed to the sliding rod 31 and configured for vertical angular adjustment and horizontal angular adjustment of at least one or more mirrors 11b. In the shown embodiment, the pivot connection is a ball and socket joint 41, wherein the mirror 11b is capable of motion around an infinite number of axes which have a common point. Further, a motor 42 is operably connected to the mirror 11b controlling the position thereof. In the shown embodiment, the motor 42 is positioned within the ball and socket joint 41. The motor 42 may comprise a omniwheel stepper motor, however, in alternative embodiment, the motor 42 may include any suitable assembly configured to move the mirrors 11b. In addition, the motor 42 is electrically connected to and powered by the vehicle 12 power source. In an alternative embodiment, the motor 42 includes a separate power source, such as a rechargeable battery. Further, the actuation of the motor 42 is controllable by a vehicle operator as desired, for example by a control box 50 within the vehicle 12.

Figure 5:
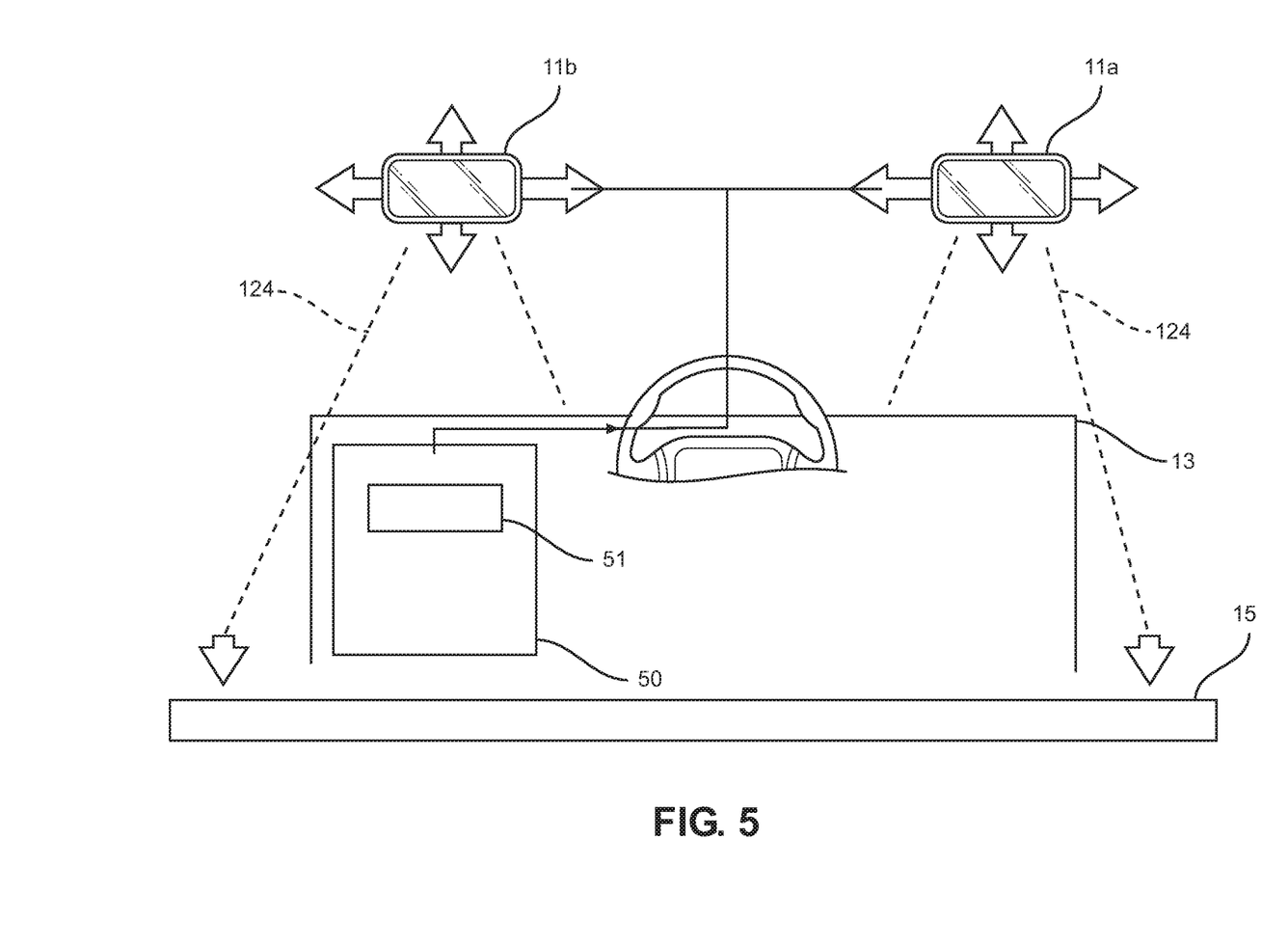
FIG. 5 shows a pictorial representation of components of a system of one exemplary embodiment of the present invention.

Referring now to FIG. 5, there is a shown pictorial representation of components of a system of one exemplary embodiment of the present invention. In the shown embodiment, the control box 50 is disposed within the cabin 13 of the vehicle, wherein the vehicle operator can operate the control box 50 and view the one or more mirrors 11a, 11b. The control box 50 is operably connected to the one or more mirrors 11a, 11b and configured to control the position of the mirrors 11a, 11b via the actuators 35 and one or more motors 42. The control box 50 includes one or more interfaces 51 to receive data and/or commands and to send data and/or commands to the one or more motors 42. The interface 51 may include one or more actuatable buttons, switches, and the like. In one embodiment, the interface 51 includes a touchscreen. The interface 51 enables the vehicle operator to control the field of view 124 of the mirrors 11a, 11b from the cabin 13. In this way, the vehicle operator selects a desired field of view 124 by inputting commands to the control box 50 via the interface 51.

In the illustrated embodiment, the control box 50 receives data and/or commands, such as positional information, from a vehicle operator via the interface 51. The positional information includes information relating to the vertical movement of the mirrors 11a, 11b and the horizontal and vertical rotation of the mirrors 11a, 11b. The positional information may be communicated to the actuators 35 and motors 42 over a wired line or a wireless connection. Upon receiving the positional information the actuators 35 change position of the mirrors 11a, 11b based on the positional information. The control box 50 may be an isolated control box, only controlling the position of the adjustable mirror assembly 10, or alternatively implemented to control other machine functions, such as steering and blade 15 positioning. For example, in one embodiment the control box 50 controls the activation, deactivation, and other functions of the light sources directed at illuminating the blade 15.

In one use, the vehicle operator seated in the cabin 13 of the vehicle 12 manipulates the interface 51 of the control box 50 so that the first side of the mirrors 11a, 11b having the reflective element thereon, are directed towards the blade 15 disposed on the underside of the vehicle. Thus, the blade 15, ground surface, and surrounding area is viewable by the vehicle operator enabling the operator to properly grade the surface as desired and ensure safe operation of the vehicle 12.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An adjustable mirror assembly comprising:
a vehicle having a body with an underside;
one or more mirrors having a reflective element disposed on the vehicle;
wherein at least one mirror of the one or more mirrors is configured to allow a vehicle operator in a driver seat to view the underside of the vehicle;
wherein the one or more mirrors include a first mirror and a second mirror, wherein the first mirror and the second mirror are disposed between a pair of front wheels of a front most axle and the driver seat;
wherein the underside of the body of the vehicle further comprises a blade configured to grade a roadway.

2. An adjustable mirror assembly of claim 1, wherein: the at least one mirror of the one or more mirrors has a field of view presented to the vehicle operator positioned in the driver seat between 20 degrees and 170 degrees.

3. An adjustable mirror assembly of claim 1, wherein: the one or more mirrors are non-planar.

4. An adjustable mirror assembly of claim 1, further comprising: one or more light sources disposed on the vehicle and configured to illuminate the underside of the vehicle.

5. An adjustable mirror assembly of claim 1, wherein: the one or more mirrors are pivotally affixed to a sliding rod via a ball and socket joint, wherein the one or more mirrors are capable of motion around an infinite number of axes which have a common point.

6. An adjustable mirror assembly of claim 5, wherein: the sliding rod comprises a first elongated section and a second elongated section fastened together in a telescopic configuration.

7. An adjustable mirror assembly of claim 5, further comprising: one or more motors operably connected to the one or more mirrors, wherein the one or more motors are configured for vertical angular adjustment and horizontal angular adjustment of the one or more mirrors.

8. An adjustable mirror assembly of claim 5, further comprising: one or more actuators operably connected to the one or more mirrors configured for vertical translation of the one or more mirrors.

9. An adjustable mirror assembly of claim 1, further comprising: a controller configured to receive inputs including positional information via an interface, to communicate outputs for selectively actuating one or more actuators or motors, and to cause the one or more actuators or motors to change the position of the one or more mirrors based on the positional information.

10. An adjustable mirror assembly of claim 9, wherein: the one or more actuators are operably connected to the one or more mirrors and configured for vertical translation of the one or more mirrors.

11. An adjustable mirror assembly of claim 9, wherein: the one or more motors are operably connected to the one or more mirrors and configured for vertical angular adjustment and horizontal angular adjustment of the one or more mirrors.

12. An adjustable mirror assembly of claim 1, wherein the first mirror and the second mirror of the one or more mirrors are configured to provide overlapping fields of view of the blade, such that the first mirror and the second mirror show the same area of the blade from a differing perspective.

13. An adjustable mirror assembly of claim 1, wherein the reflective element of each of the one or more mirrors is facing towards a rear of the vehicle.

14. An adjustable mirror assembly comprising:
a vehicle having a body with an underside;
one or more mirrors having a reflective element disposed on the vehicle;
wherein at least one mirror of the one or more mirrors is configured to allow a vehicle operator in a driver seat to view the underside of the vehicle;
wherein the one or more mirrors include a first mirror and a second mirror, wherein the first mirror and the second mirror are disposed between a pair of front wheels of a front most axle and the driver seat;
wherein the first mirror and the second mirror of the one or more mirrors are configured to provide overlapping fields of view of a blade secured to the body of the vehicle, such that each mirror shows the same area of the blade from a differing perspective.

* * * * *